United States Patent
Seo

(10) Patent No.: US 7,869,846 B2
(45) Date of Patent: Jan. 11, 2011

(54) SLIDING MODULE FOR SLIDING-TYPE PORTABLE TERMINAL

(75) Inventor: Jung Hwan Seo, Seoul (KR)

(73) Assignee: Samsung Electronics Co., Ltd (KR)

( * ) Notice: Subject to any disclaimer, the term of this patent is extended or adjusted under 35 U.S.C. 154(b) by 624 days.

(21) Appl. No.: 11/862,936

(22) Filed: Sep. 27, 2007

(65) Prior Publication Data

US 2008/0076380 A1   Mar. 27, 2008

(30) Foreign Application Priority Data

Sep. 27, 2006 (KR) .................. 10-2006-0094185

(51) Int. Cl.
*H04M 1/02* (2006.01)

(52) U.S. Cl. .................................. 455/575.4

(58) Field of Classification Search ............. 455/575.1, 455/575.3, 575.4
See application file for complete search history.

(56) References Cited

U.S. PATENT DOCUMENTS

| | | | | |
|---|---|---|---|---|
| 6,822,871 | B2 | 11/2004 | Lee et al. | |
| 7,184,806 | B2 * | 2/2007 | Bae | 455/575.4 |
| 7,245,949 | B2 * | 7/2007 | Kim et al. | 455/575.4 |
| 7,433,723 | B2 * | 10/2008 | Bae | 455/575.4 |
| 7,630,744 | B2 * | 12/2009 | Lee | 455/575.4 |
| 2006/0079299 | A1 * | 4/2006 | Chen et al. | 455/575.1 |
| 2006/0154703 | A1 * | 7/2006 | Kim | 455/575.4 |

FOREIGN PATENT DOCUMENTS

| KR | 1030060000416 | 1/2006 |
|---|---|---|
| KR | 1020060022532 | 3/2006 |

* cited by examiner

*Primary Examiner*—Blane J Jackson
(74) *Attorney, Agent, or Firm*—The Farrell Law Firm, LLP

(57) ABSTRACT

Disclosed is a sliding module for a sliding-type portable terminal, which is adapted to provide one side of a sliding-type housing with dual elastic force for easy opening/closing operation. The sliding module for a sliding-type portable terminal having a main housing and a sliding housing adapted to slide on the main housing while facing the main housing includes a coupling portion formed on a side of the main housing; a guide member coupled to the coupling portion so as to guide a sliding movement of the sliding housing; and a dual elastic member fastened to the sliding housing while facing the guide member, the dual elastic member providing elastic force in a direction of movement of the sliding housing when the sliding housing is slid and in a direction perpendicular to the direction of movement of the sliding housing.

11 Claims, 13 Drawing Sheets

SLIDING MODULE FOR SLIDING-TYPE PORTABLE TERMINAL

PRIORITY

This application claims priority to an application filed with the Korean Intellectual Property Office on Sep. 27, 2006 and assigned Serial No. 2006-94185, the contents of which are incorporated herein by reference.

BACKGROUND OF THE INVENTION

1. Field of the Invention

The present invention relates to a sliding module for a sliding-type portable terminal, which is adapted to provide one side of a sliding-type housing with dual elastic force for smooth sliding operation.

2. Description of the Related Art

In general, "portable communication apparatus" refers to an electronic apparatus that a user can carry to perform wireless communication. Portable communication apparatuses may be classified into various categories according to their appearance, such as bar-type apparatuses, flip-type apparatuses, and folder-type apparatuses. The bar-type apparatuses have a single housing shaped like a bar. The flip-type apparatuses have a flip rotatably coupled to a bar-shaped housing by a hinge device. The folder-type apparatuses have a folder connected to a single bar-shaped housing by a hinge device so that the folder can be rotated to fold on or unfold from the housing.

In addition, portable communication apparatuses may be classified into rotation-type apparatuses and sliding-type apparatuses according to the manner of opening and closing them. In the rotation-type apparatuses, two housings are coupled to each other so that one housing rotates to be opened or closed relative to the other while they face each other. In the sliding-type apparatuses, two housings are coupled to each other so that one housing slides along a longitudinal direction to be opened or closed relative to the other housing. These variously classified portable communication apparatuses can be easily understood by those skilled in the art.

Referring to FIGS. 1 to 5, a conventional sliding-type portable terminal 1 includes a main body 2, a number of keypads 2a positioned on the main body 2, a microphone device 2b positioned on the main body 2, and a sliding body 3 adapted to slide a distance corresponding up to half the length of the main body 2 in the upward or downward direction so as to expose the main body 2. The main body 2 is usually provided with a 3×4 keypad. On the front surface of the sliding body 3, an auxiliary keypad composed of a number of auxiliary keys, a speaker device 3a, and a display device 3b may be positioned.

More particularly, referring to FIGS. 1-4, a conventional sliding-type portable terminal 1 includes a main body 2, a sliding body 3 adapted to slide up to a predetermined distance on the main body 2, guide means 4a, 4b, 4c positioned in the main and sliding bodies 2 and 3 to guide the sliding body 3 on the main body 2, and at least one coil spring 5 positioned between the main and sliding bodies 2 and 3 to provide elastic force so that the sliding body 3 can slide upwards or downwards.

Referring to FIGS. 3 and 4, the main body 2 has a flat main plate 2c, and the sliding body 3 has a flat sliding plate 3c.

The guide means 4 have guide ribs 4a positioned on both sides of the sliding plate 3c. The main plate 2c is provided with guide slots 4b, which are coupled to the guide ribs 4a.

However, the conventional sliding-type portable terminal, which has a main plate in the main body, a sliding plate in the sliding body, and a torsion spring positioned between the plates so that the sliding body can slide, has a problem in that the radius of rotation of the spring and the resulting distance of movement depend on the width of the plates. More particularly, the size and thickness of the plates can hardly be reduced. This is an obstacle to making the terminal in a compact size with an aesthetic appearance.

Furthermore, the terminal has a flexible circuit, which is connected to an LCD, and a torsion spring on the central portion. The flexible circuit and the torsion spring may interfere with and damage each other. In addition, the fact that the flexible circuit and the torsion spring overlap each other increases the thickness of the terminal and adversely affects the slimness.

U.S. Pat. No. 6,822,871 commonly assigned to the assignee of the present application discloses a sliding-type portable communication apparatus, which includes two housings having a predetermined thickness, as well as a flexible circuit and a torsion spring contained in the corresponding housings. This construction has a problem in that the vertical dimension of the terminal, i.e. the thickness, inevitably increases. This adversely affects the slimness and provides users with a poor grip. In addition, the exterior design is limited to a large extent.

SUMMARY OF THE INVENTION

Accordingly, the present invention has been made to solve the above-mentioned problems occurring in the prior art, and an object of the present invention is to provide a sliding module for a sliding-type portable terminal, which is adapted to provide one side of a sliding-type housing with dual elastic force for smooth sliding operation.

Another object of the present invention is to provide a sliding module for a sliding-type portable terminal, which is positioned not on a central portion of a housing as in the case of conventional modules, but on one side of the housing so as to avoid interference between components of the terminal and reduce the space occupied by the central portion of the terminal for slimness and compactness.

In order to accomplish these objects, there is provided a sliding module for a sliding-type portable terminal having a main housing and a sliding housing adapted to slide on the main housing while facing the main housing, the sliding module including a coupling portion formed on a side of the main housing; a guide member coupled to the coupling portion so as to guide a sliding movement of the sliding housing; and a dual elastic member fastened to the sliding housing while facing the guide member, the dual elastic member providing elastic force in a first direction of movement of the sliding housing when the sliding housing is slid and in a second direction perpendicular to the first direction.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted for clarity and conciseness.

Figure 1:
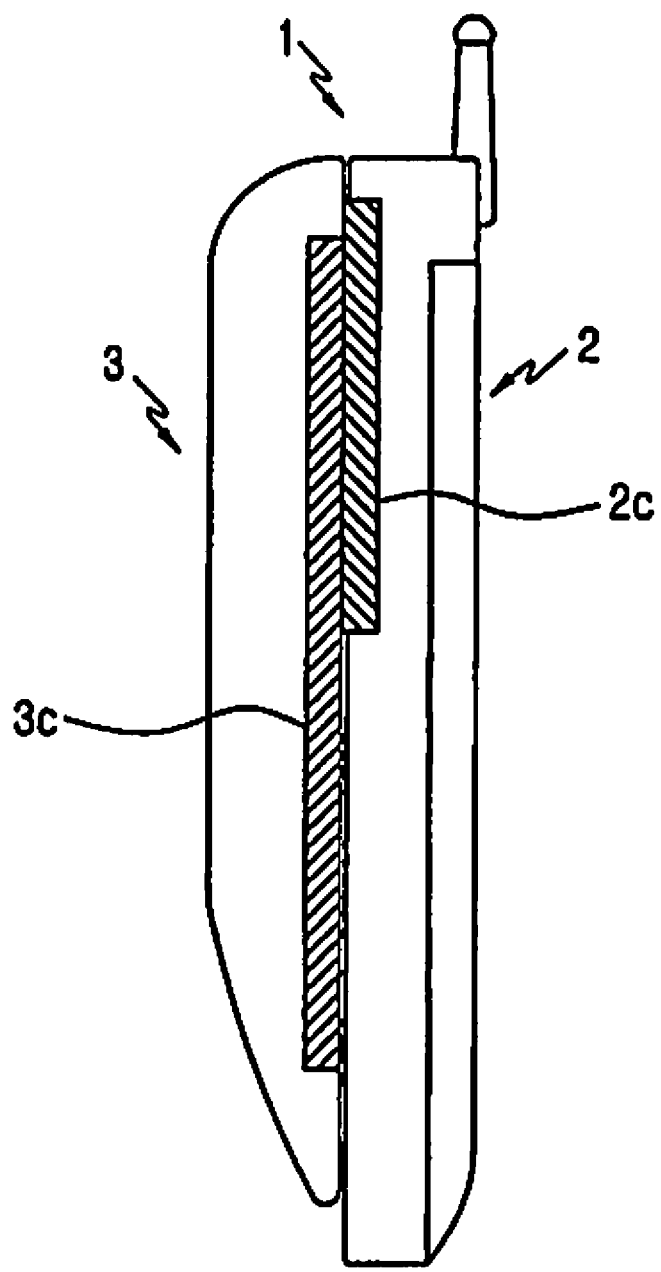
FIG. 1 is a lateral view showing a conventional sliding-type portable terminal before sliding to open.
Figure 2:
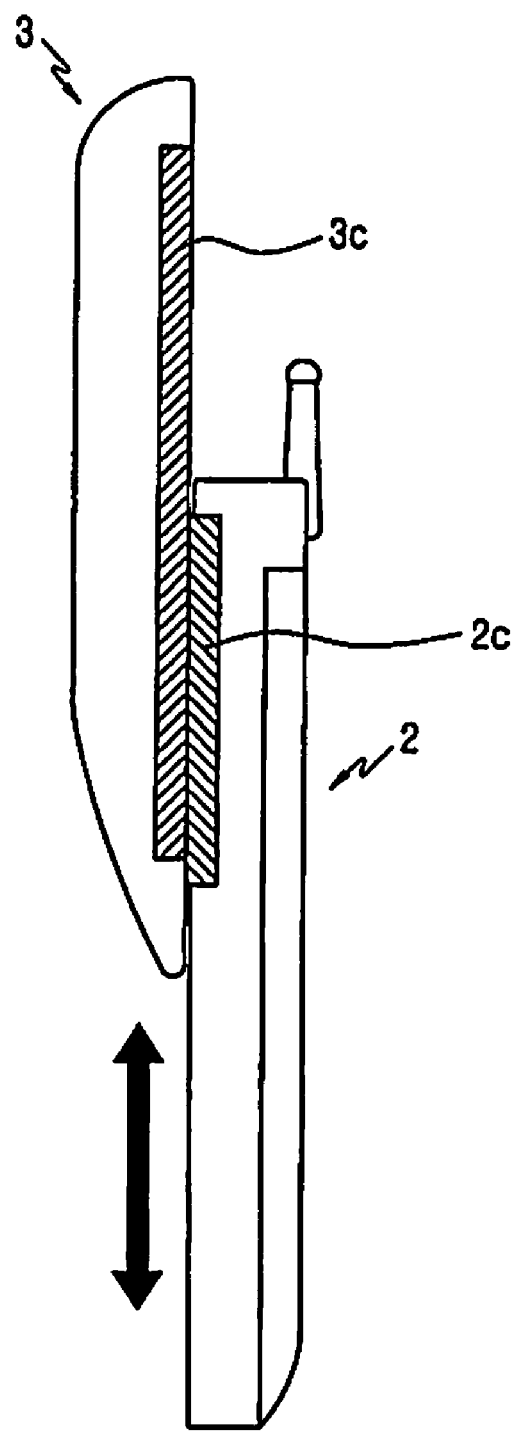
FIG. 2 is a lateral view showing the terminal in FIG. 1 after the sliding.
Figure 3:
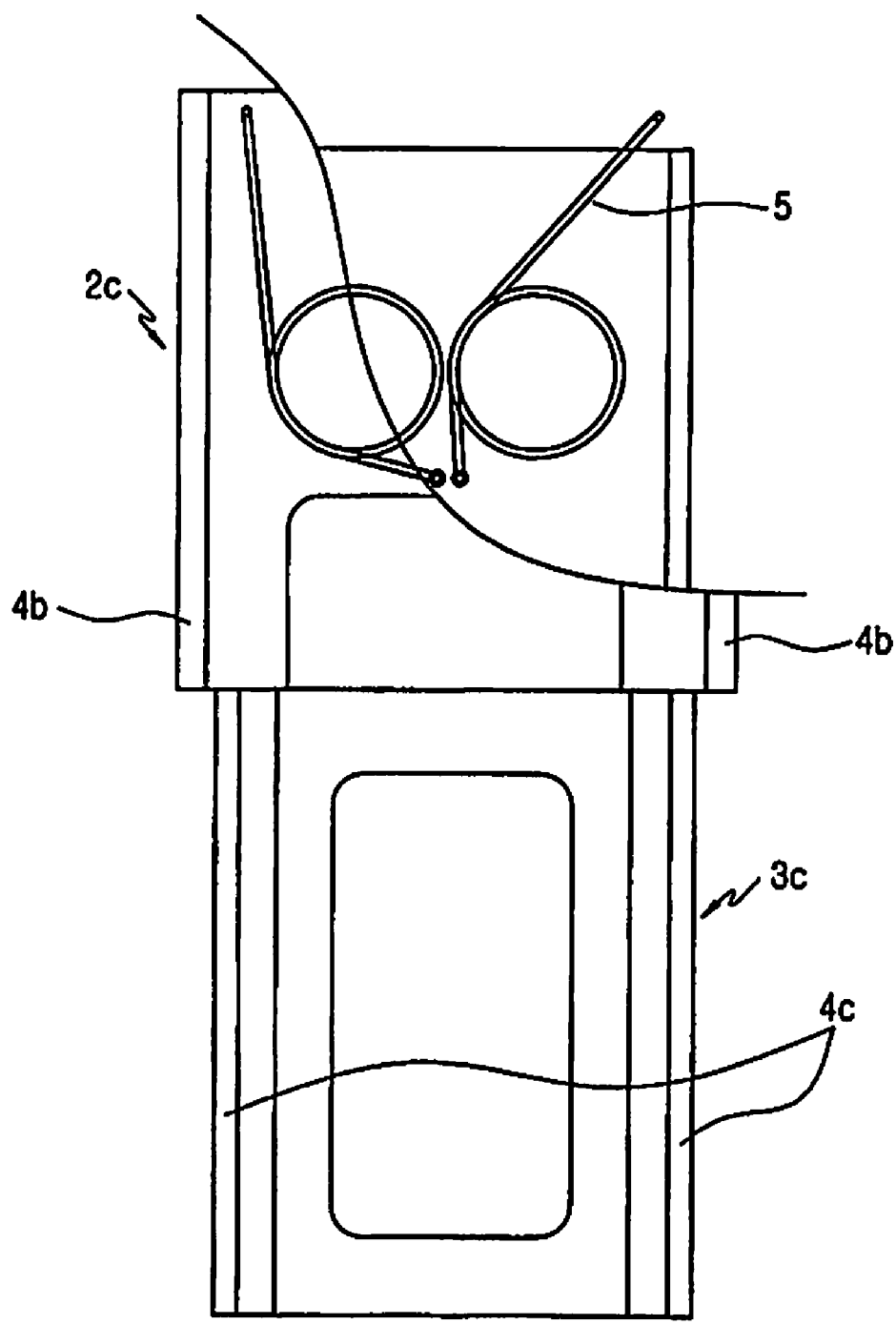
FIG. 3 is a front view showing a main plate, a sliding plate, and a driving spring of the terminal in FIG. 1.
Figure 4:
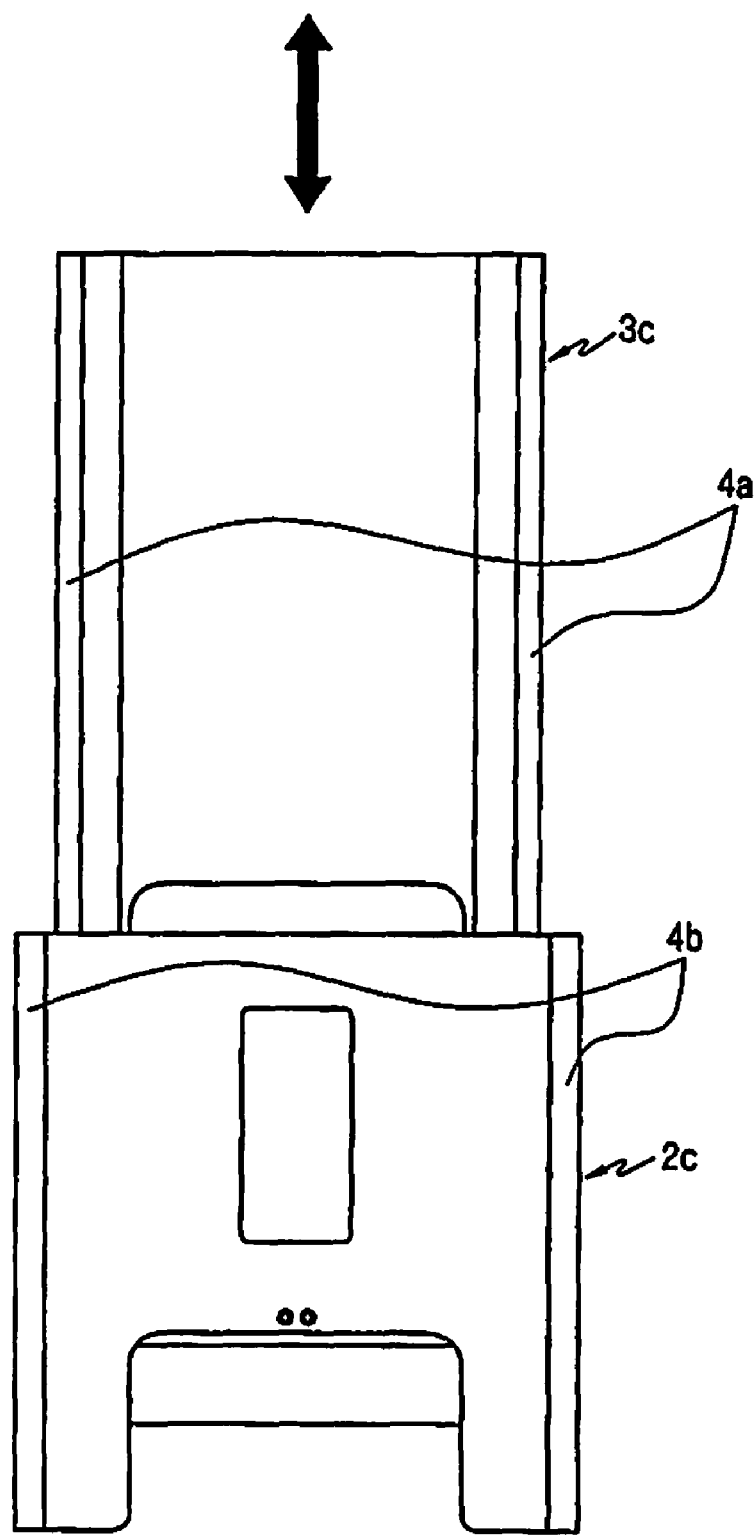
FIG. 4 is a front view showing a main plate and a sliding plate of the terminal shown in FIG. 1.
Figure 5:
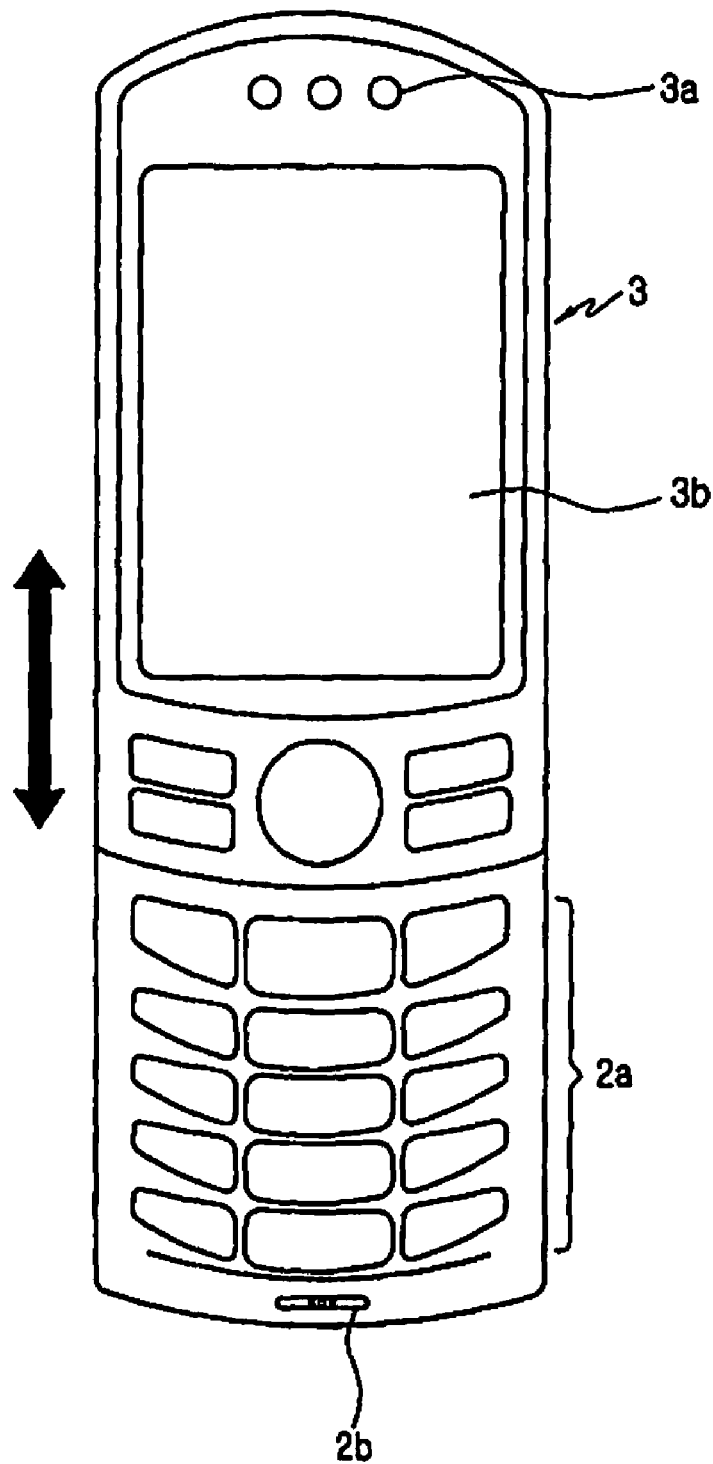
FIG. 5 is a front view showing a conventional sliding-type portable terminal while its sliding housing slides.
Figure 6:
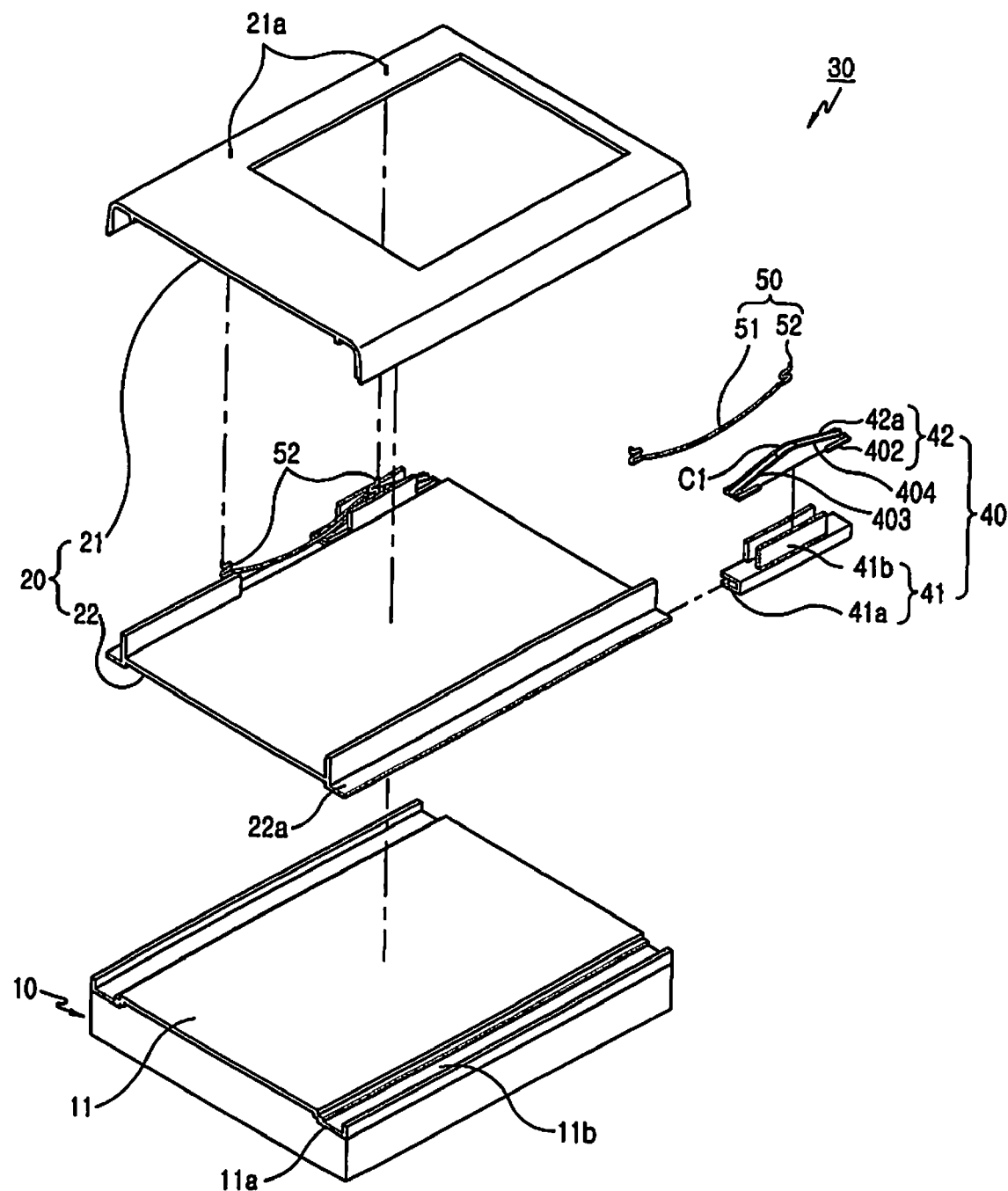
FIG. 6 is an exploded perspective view showing the construction of a sliding module of a sliding-type portable terminal according to the present invention.
Figure 7:
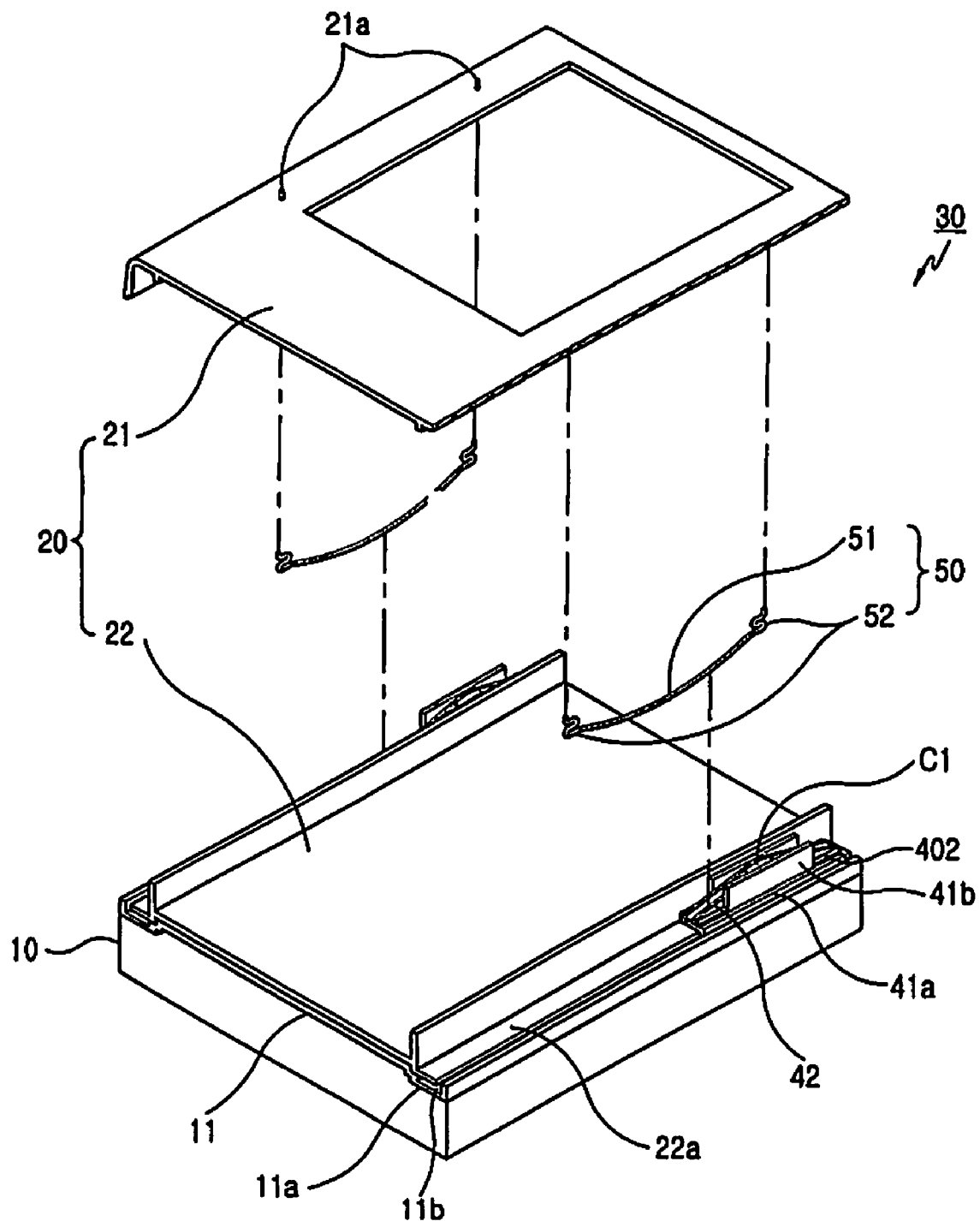
FIG. 7 is an exploded perspective view showing the construction of a sliding module of a sliding-type portable terminal, before a dual elastic member is coupled, according to the present invention.

Referring to FIGS. 6 and 7, a sliding module for a sliding-type portable terminal includes coupling portions 11a, guide members 40, and dual elastic members 50. The coupling portions 11a are formed on both sides of a front cover 11 of a main housing 10 so that the guide members 40 are coupled and fixed to the coupling portions 11a to guide the sliding of the sliding housing 20. The dual elastic members 50 are fastened to a sliding housing 20 while facing the guide members 40 and, when the sliding housing 20 slides, to provide elastic force in the sliding direction, as well as in a direction perpendicular to a sliding plane of the sliding housing 20. The coupling portions 11a have fastening recesses 11b so as to be fastened and fixed to the guide members 40.

Referring to FIG. 6, the sliding housing 20 includes upper and lower cases 21 and 22, respectively. The upper case 21 has at least one fixing portion 21a, to which second wire springs 52 of the dual elastic members 50 are fastened and fixed. The lower case 22 has guide rails 22a formed on both sides thereof so that the sliding housing 20 is coupled to the guide members 40 while being able to slide.

Referring to FIG. 6, each guide member 40 includes a guide portion 41 and a guide palm 42. The guide portions 41 are fixed to the fastening recesses 11b of the front cover 11 and guide the sliding of the guide rails 22a. The guide palms 42 are coupled to the guide portions 41 while facing the dual elastic members 50 so as to guide the dual elastic members 50 when they slide together with the sliding housing 20.

Referring to FIG. 7, the guide portions 41 have a guide recess 41a to be coupled to the guide rails 22a and a seating portion 41b formed on top of the guide recess 41a so that the guide palms 42 are seated and fixed.

Figure 8:
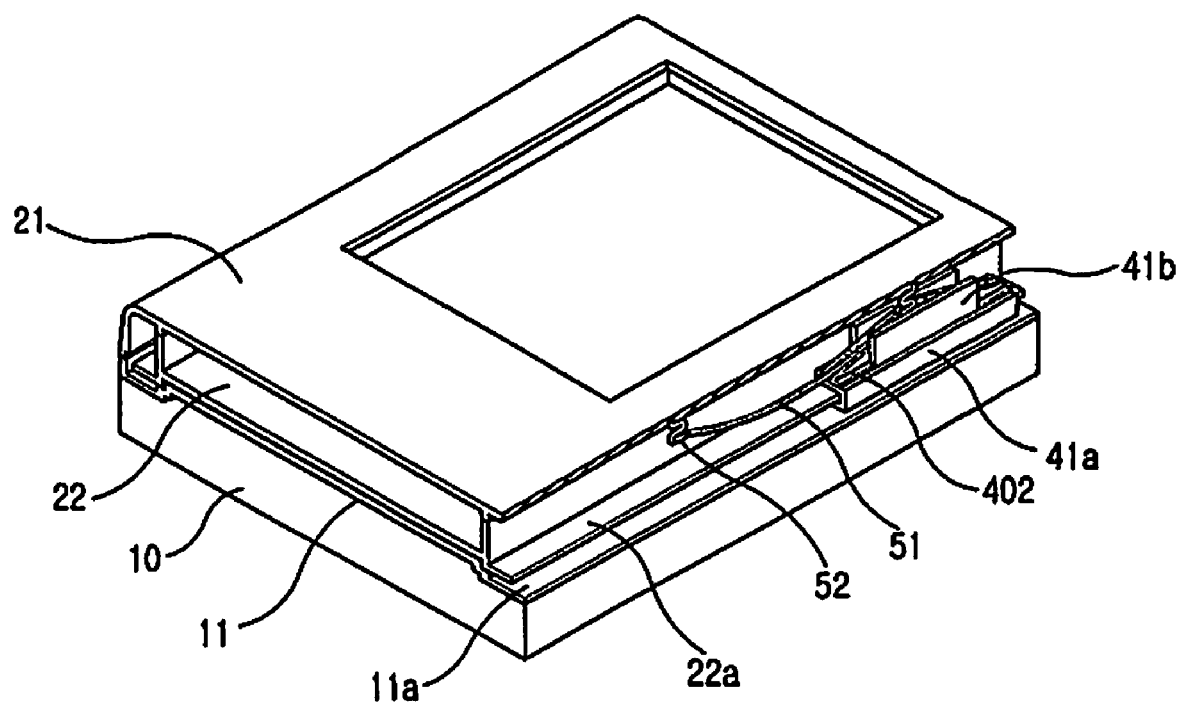
FIG. 8 is an assembled perspective view showing a sliding module of a sliding-type portable terminal according to the present invention.

Referring to FIGS. 6 and 8, each guide palm 42 has a wire recess 42a formed thereon so as to guide the dual elastic members 50 while facing them when they slide together with the sliding housing 20 and a guide fixing portion 402 formed beneath the wire recess 42a so that the seating portions 41b of the guide portions 41 are fastened and fixed thereto.

Referring to FIGS. 8-13, the wire recesses 42a protrude up to a predetermined height and have a crest. Particularly, the wire recesses 42a have first and second guide surfaces 403 and 404, respectively. The first guide surfaces 403 guide the dual elastic members 50 while facing them when the sliding housing 20 slides. The second guide surfaces 404 similarly guide the dual elastic members 50 while facing them when the sliding housing 20 slides. The wire recesses 42a have a curved point C1 defined at their center. When the sliding housing 20 slides, the dual elastic members 50 slide together while being guided by the wire recesses 42a until they reach the curved point C1. When the dual elastic members 50 reach the curved point C1, they unbend and, after passing the curved point C1, they bend again. As such, the dual elastic members 50 provide elastic force necessary to slide the sliding housing 20.

Figure 10:
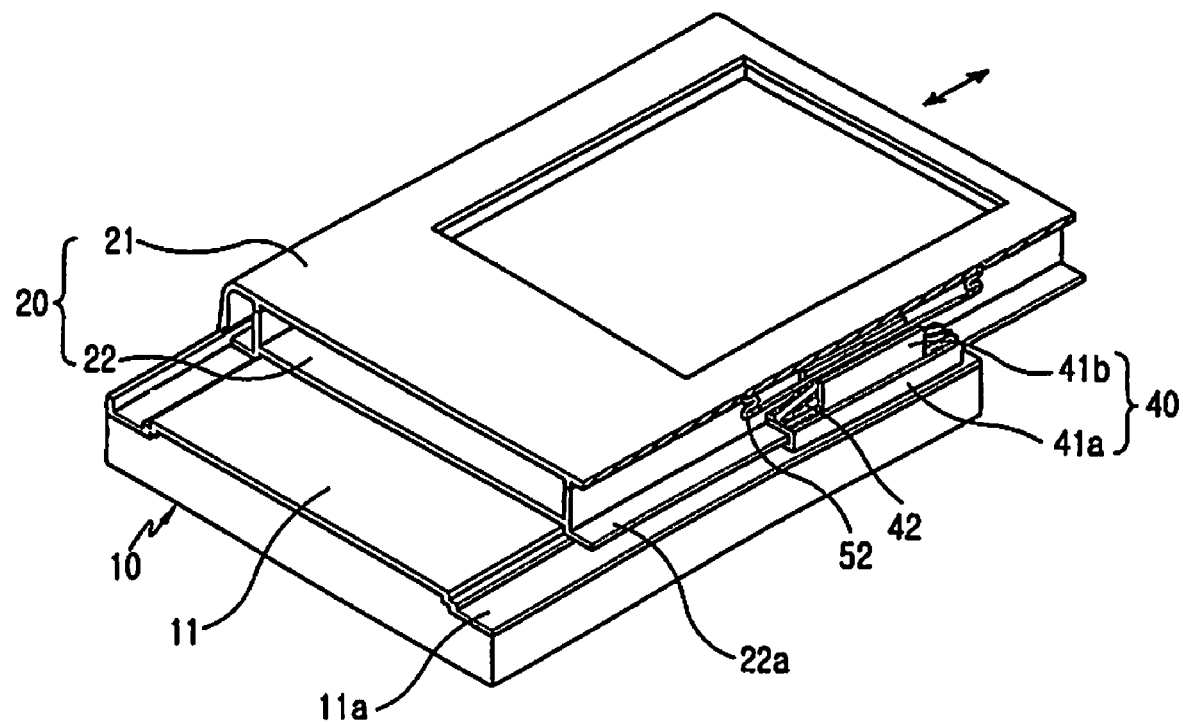
FIG. 10 is a perspective view showing a sliding module of a sliding-type portable terminal, during the slide, according to the present invention.
Figure 11:
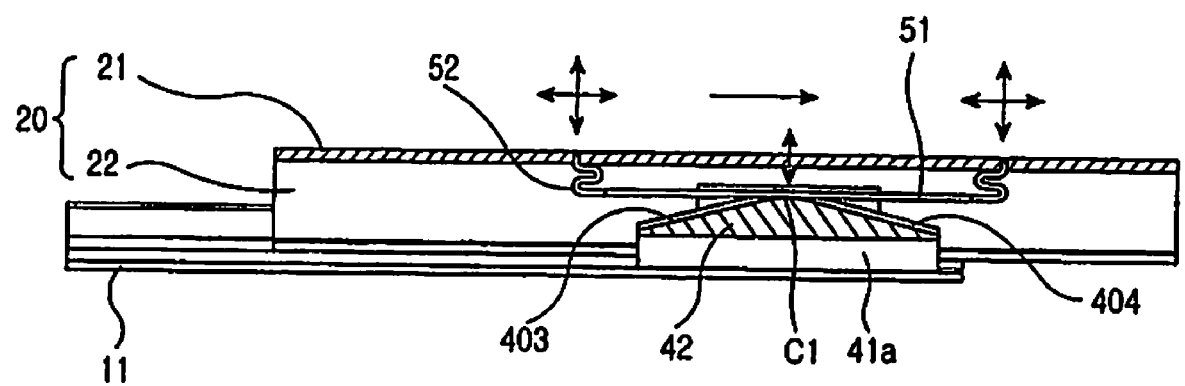
FIG. 11 is a lateral view showing a sliding module of a sliding-type portable terminal, during the slide, according to the present invention.

Referring to FIGS. 6, 10, and 11, the dual elastic members 50 include first and second wire springs 51 and 52, respectively. The first wire springs 51 are guided along the wire recesses 42a when the sliding housing 20 is sliding. Particularly, the first wire springs 51 face the first and second guide surfaces 403 and 404, respectively, of the wire recesses 42a so that the first wire springs 51a bend in an upward/downward direction, i.e. in a direction perpendicular to the sliding plane of the sliding housing 20. After passing the curved point C1 of the wire recesses 42a, the first wire springs 51a regain their original shape. The second wire springs 52 are positioned on both ends of the first wire springs 51 so that, when the first wire springs 51 bend, elastic force is generated in the leftward/rightward direction, i.e. along or opposite the direction of sliding of the sliding housing 20, as well as in the direction perpendicular to the sliding plane.

The dual elastic members 50 are made of a metallic material so as to exert elastic force for a long period of time during sliding.

The operation of the sliding module for a sliding-type portable terminal according to the present invention, which is constructed as above, will now be described with reference to FIGS. 6 to 13.

Referring to FIGS. 6 and 7, the sliding module 30 for a sliding-type portable terminal includes a main housing 10, a sliding housing 20, coupling portions 11a, guide members 40, and dual elastic members 50.

The coupling portions 11a are positioned on both sides of a front cover 11 of the main housing 10. The guide members 40 are fastened and fixed to the coupling portions 11a.

The coupling portions 11a have fastening recesses 11b.

Referring to FIG. 7, the dual elastic members 50 include first and second wire springs 51 and 52, respectively.

The sliding housing 20 includes upper and lower cases 21 and 22, respectively. The upper case 21 has at least one fixing portion 21a formed on both sides of its interior so that second wire springs 52 of the dual elastic members 50 are fastened and fixed to the fixing portions 21a by insert molding.

The guide members 40 are movably coupled to guide rails 22a formed on the lower case 22.

The guide members 40 have guide portions 41 so as to be fixed to the coupling portions 11a and to guide the sliding of the guide rails 22a. The guide portions 40 have guide recesses 41a to be coupled to the guide rails 22a.

Guide palms 42 are coupled and fixed to the top of the guide recesses 41a while facing the dual elastic members 50.

Seating portions 41b are formed on the top of the guide recesses 41a so that the guide palms 42 are seated and fixed.

The guide palms 42 have guide fixing portions 402 so that, when the guide palms 42 are coupled to the seating portions 41b, the guide fixing portions 402 are fastened thereto to fix the guide palms 42.

Figure 9:
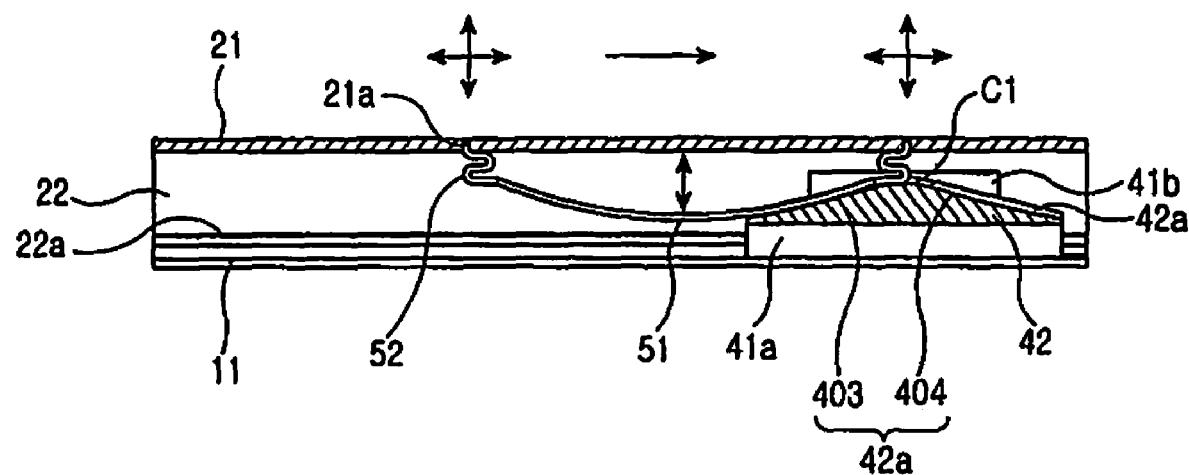
FIG. 9 is a lateral view showing a sliding module of a sliding-type portable terminal, before a slide to open, according to the present invention.

Referring to FIGS. 7 to 9, when the upper and lower cases 21 and 22 are coupled to each other, the dual elastic members 50 fastened to the upper case 21 are coupled to and face the guide palms 42 fixed to the guide members 40. The guide palms 42 have wire recesses 42a, which face the dual elastic members 50. The center of first wire springs 51 of the dual elastic members 50 faces first guide surfaces 403 of the wire recesses 42a. The wire recesses 42a have first and second guide surfaces 403 and 404, respectively.

When the sliding housing 20 is slid away from the main housing 10 as shown in FIGS. 10 and 11, the first wire springs 51 are guided along the first guide surfaces 403 of the wire recesses 42a and are bent in the upward/downward direction, i.e. in a direction perpendicular to the sliding plane of the sliding housing 20.

Referring to FIG. 11, the wire recesses 42a protrude up to a predetermined height and have a crest, which has a curved point C1 defined at the center thereof. When the sliding housing 20 slides, the first wire springs 51 slide together while being guided by the first guide surfaces 403 of the wire recesses 42a until they reach the curved point C1. After passing the curved point C1, the first wire springs 51 face the second guide surfaces 404 of the wire recesses 42a.

Figure 12:
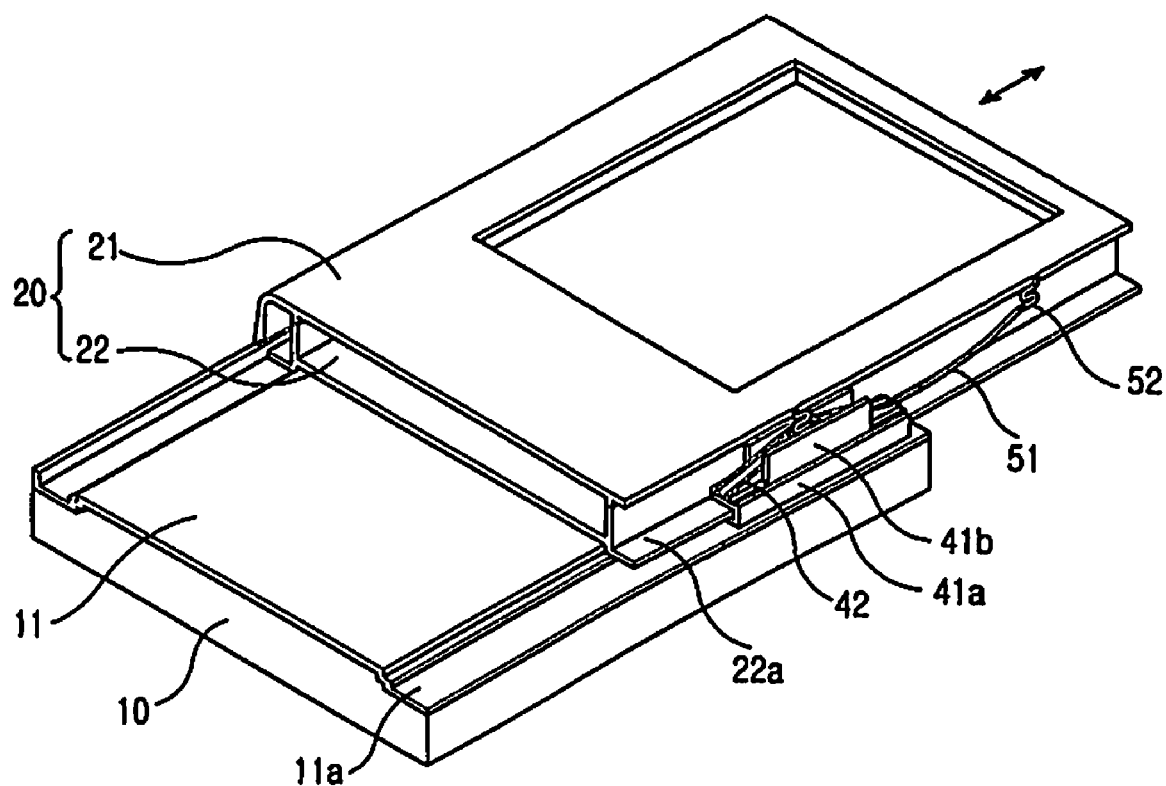
FIG. 12 is a perspective view showing a sliding module of a sliding-type portable terminal, after the slide, according to the present invention.
Figure 13:
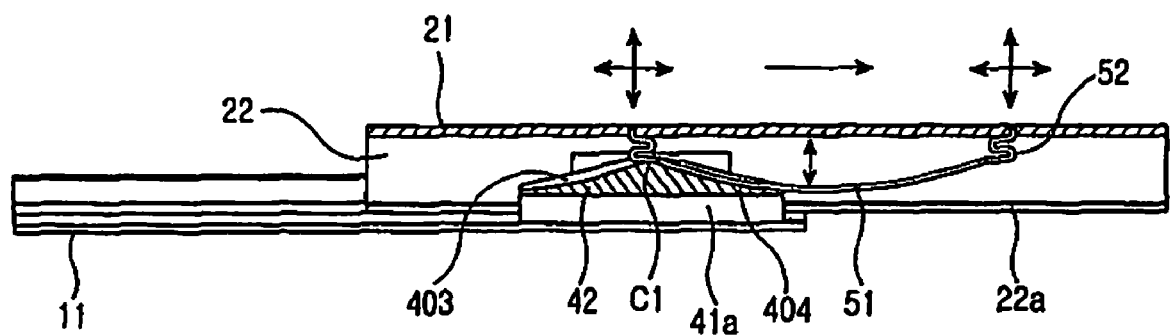
FIG. 13 is a lateral view showing a sliding module of a sliding-type portable terminal, after the slide, according to the present invention.

Referring to FIGS. 12 and 13, the first wire springs 51 bend again, after passing the curved point C1, and provide elastic force necessary to slide the sliding housing 20 in a semi-automatic manner.

Referring to FIG. 13, second wire springs 52 are formed on both ends of the first wire springs 51 so as to provide elastic force in the leftward/rightward direction, i.e. along or opposite the direction of sliding of the sliding housing 20, as well as in the upward/downward direction, i.e. in a direction perpendicular to the sliding plane. This facilitates the sliding of the sliding housing 20. As such, the dual elastic members 50 provide primary elastic force by the first wire springs 51 and, after sliding, provide secondary elastic force by the second wire springs 52 so that the sliding housing 20 can slide more smoothly.

When the sliding housing 20 slides, the guide rails 22a of the lower case 22 slide accordingly while being guided by the guide recesses 41a of the guide portions 40, which are fixed to the main housing 10.

When the sliding housing 20 is slid towards the main housing 10, i.e. to the original (closed) position, as shown in FIG. 8, the dual elastic members 50 move together. Particularly, the first wire springs 51 of the dual elastic members 50 are guided along the second guide surfaces 404 of the wire recesses 42a. After passing the curved point C1, the first wire springs 51 face the first guide surfaces 403.

The first wire springs 51 bend in the upward/downward direction, i.e. in a direction perpendicular to the sliding plane of the sliding housing 20, and regain their original shape. Then, the first wire springs 51 provide elastic force necessary to slide the sliding housing 20 in a semi-automatic manner. The second wire springs 52 provide elastic force in the leftward/rightward direction, i.e. along or opposite the sliding direction, as well as in the upward/downward direction so that the sliding housing 20 can slide more smoothly.

As mentioned above, the sliding module for a sliding-type portable terminal according to the present invention is adapted to provide one side of the terminal with dual elastic force so as to facilitate the sliding of the terminal, reduce the space necessary to install elastic members for slimness and compactness, and decrease the number of components for a shorter manufacturing process and a lower manufacturing cost.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A sliding module for a sliding-type portable terminal having a main housing and a sliding housing adapted to slide on the main housing while facing the main housing, the sliding module comprising:
   a coupling portion formed on a side of the main housing;
   a guide member coupled to the coupling portion so as to guide a sliding movement of the sliding housing; and
   a dual elastic member fastened to the sliding housing while facing the guide member, the dual elastic member providing elastic force in a sliding direction of the sliding movement of the sliding housing when the sliding housing is slid and in a first direction perpendicular to a sliding plane of the sliding housing.

2. The sliding module as claimed in claim 1, wherein the main housing has a front cover, the coupling portion is formed on a side of the front cover, and the coupling portion has a fastening recess to be fastened and fixed to the guide member.

3. The sliding module as claimed in claim 1, wherein the sliding housing comprises an upper case and a lower case, the upper case has at least one fixing portion to be fastened and fixed to the dual elastic member, and the lower case has a guide rail formed on a side, the guide rail being coupled to the guide member while being able to slide.

4. The sliding module as claimed in claim 3, wherein the guide member comprises:
   a guide portion fixed to the coupling portion so as to guide a sliding movement of the guide rail; and
   a guide palm coupled to the guide portion and coupled to the dual elastic member while facing the dual elastic member so as to guide the dual elastic member when the dual elastic member slides together with the sliding housing.

5. The sliding module as claimed in claim 4, wherein the guide portion has a guide recess coupled to the guide rail and a seating portion formed on an upper portion of the guide recess so as to seat and fix the guide palm.

6. The sliding module as claimed in claim 5, wherein the guide palm has a wire recess so as to guide the dual elastic member while facing the dual elastic member and a guide fixing portion formed on a lower portion of the wire recess so as to be fastened and fixed to the seating portion of the guide portion.

7. The sliding module as claimed in claim 6, wherein the wire recess has a first and a second guide surfaces adapted to guide the dual elastic member while facing the dual elastic member according to a movement of the sliding housing.

8. The sliding module as claimed in claim 6, wherein the wire recess has a crest protruding up to a predetermined height, a curved point is defined at a central portion of the crest, the dual elastic member is adapted to move together with the sliding housing while being guided along the wire recess when the sliding housing is slid, the dual elastic member is adapted to unbend when reaching the curved point, and the dual elastic member is adapted to bend again and provide elastic force for sliding the sliding housing after passing the curved point.

9. The sliding module as claimed in claim 6, wherein the dual elastic member comprises first and second wire springs, the first wire spring is adapted to face the wire recess and to be guided along the wire recess, when the sliding housing is slid, so that the first wire spring bends in the first direction, the first wire spring is adapted to regain an original shape and provide elastic force after passing the curved point of the wire recess, the second wire spring is provided on each end of the first wire spring, and the second wire spring is adapted to provide elastic force in a direction along or opposite the sliding direction of the sliding housing and in the first direction when the first wire spring bends.

10. The sliding module as claimed in claim 1, wherein the dual elastic member is made of a metallic material.

11. A sliding module for a sliding-type portable terminal having a main housing and a sliding housing adapted to slide on the main housing while facing the main housing, the sliding module comprising:

a pair of guide members coupled to the main housing so as to guide a sliding movement of the sliding housing; and a dual elastic member fastened to the sliding housing while facing the guide members, the dual elastic member providing elastic force in a sliding direction of the sliding housing and in a direction perpendicular to the sliding direction when the sliding housing is slid.

* * * * *